May 15, 1923.
A. MOORHOUSE
MOTOR VEHICLE
Filed Feb. 7, 1920
1,455,169
3 Sheets-Sheet 2
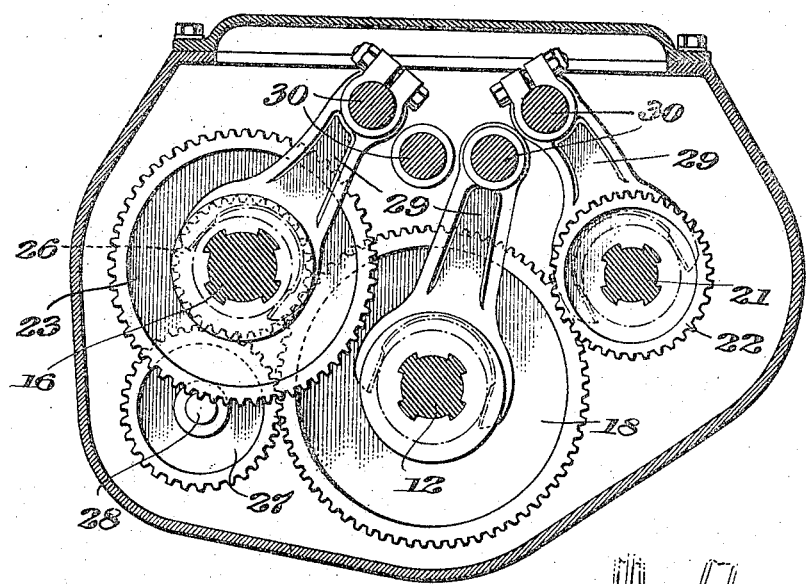
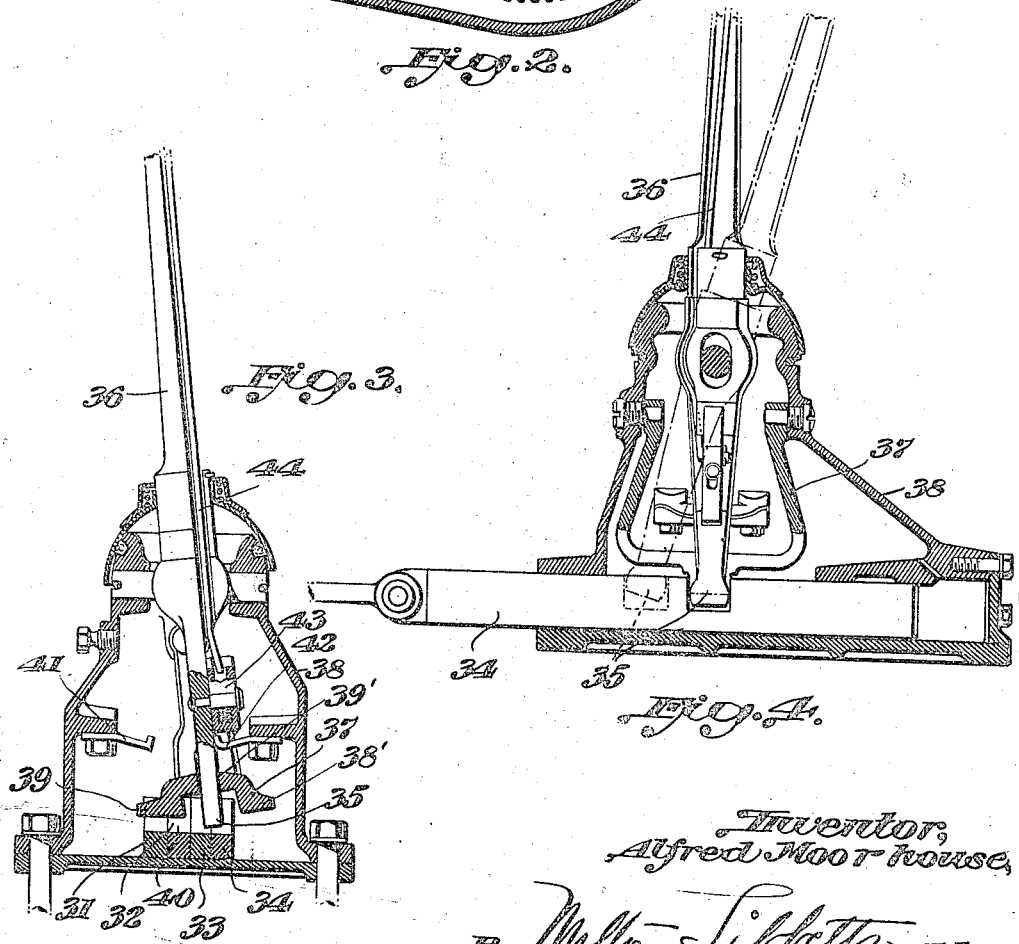

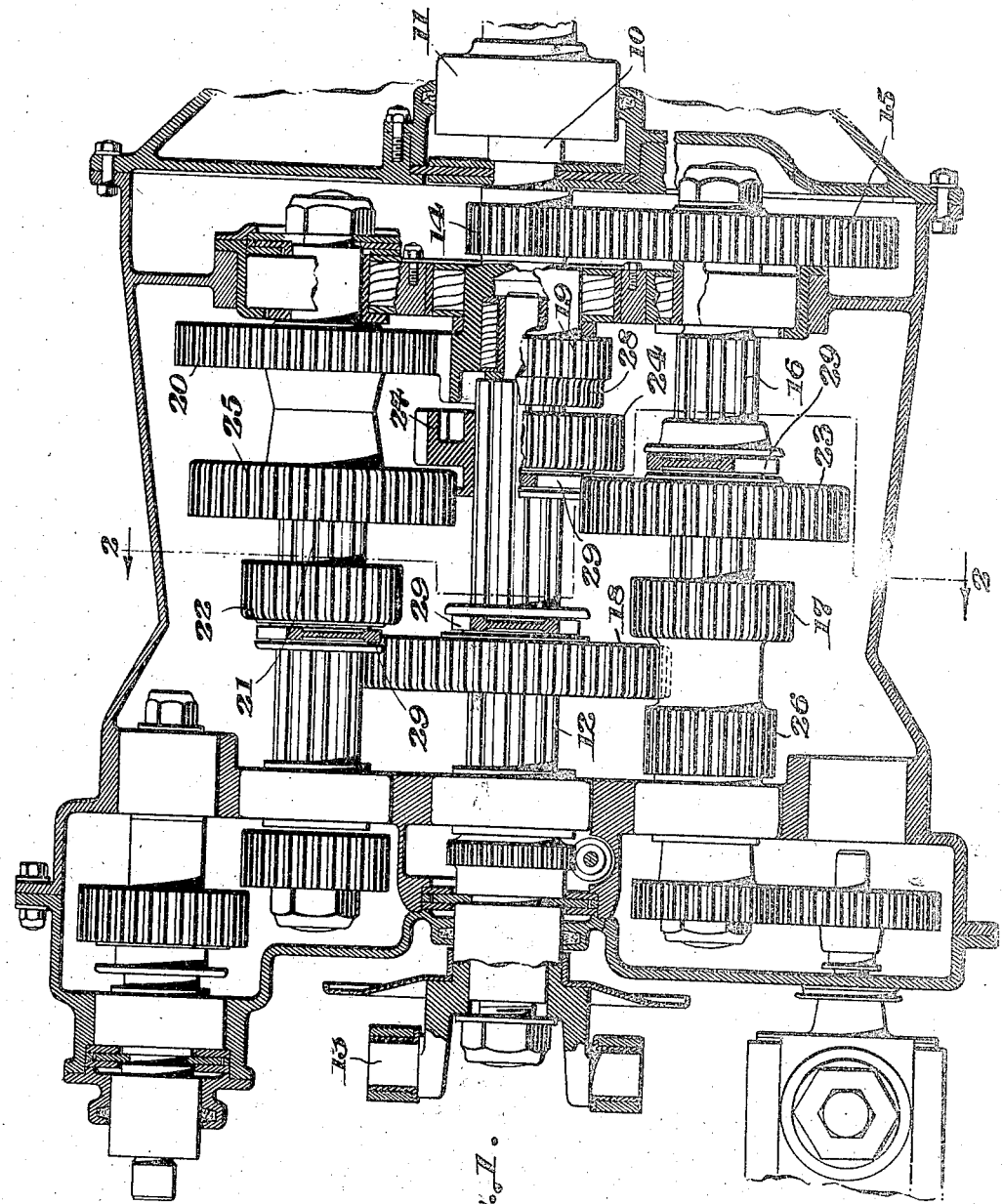

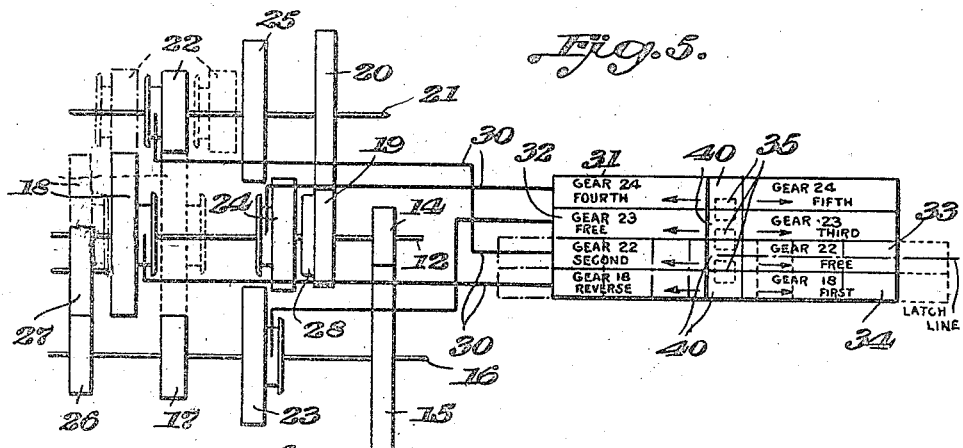
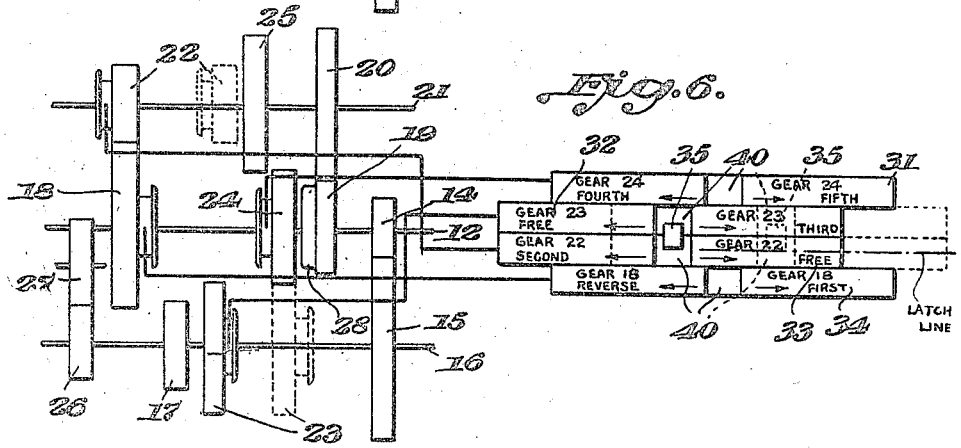
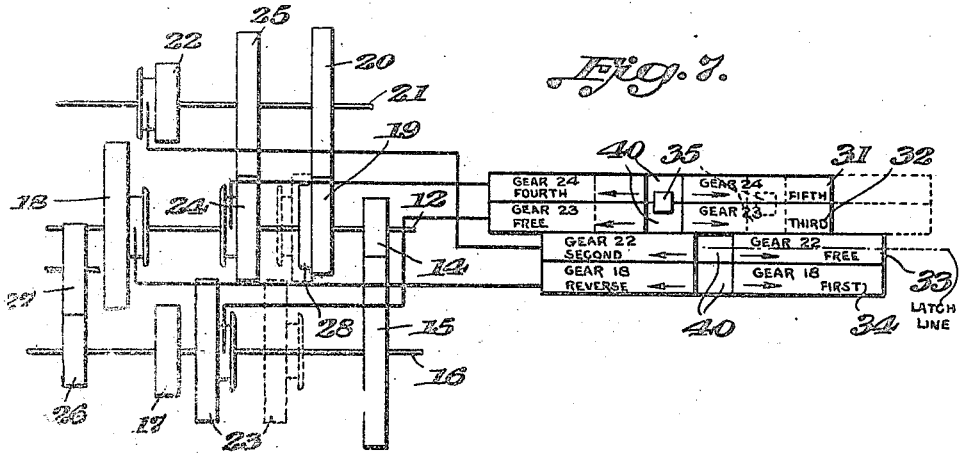

Patented May 15, 1923.

1,455,169

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed February 7, 1920. Serial No. 356,823.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles and more particularly to change speed mechanisms therefor.

The present object of the invention is to provide a mechanism of this kind particularly adapted for use with heavy trucks and capable of at least five changes of speed in one direction and adapted for obtaining these results by a construction which will prevent deflection of the gear carrying shafts and undue wear of the bearings and enable a more compact arrangement of the gear case to be provided.

Another object of the invention is to enable the operation of the gears to effect these various adjustments for the different speeds to be obtained by the same number of shifter rails formerly employed in connection with four speed transmissions.

With these objects and others in view, the invention is embodied in preferable form in the construction and arrangement hereinafter described and illustrated in the accompanying drawings, in which:

Figure 1 is a horizontal section through the transmission case showing the gears and shafts in full lines; and Figure 2 is an end view partly in vertical section;

Figure 3 is a vertical section partly in elevation showing the shifter rails or bars and the gear shift lever;

Figure 4 is a vertical section at right angles to Figure 3 showing the gear shift lever and bars;

Figure 5 is a diagram of the gears and the shifter bars which are adapted to operate the same, showing the same in full lines in neutral position corresponding to the position occupied by the gears in Figure 1 and showing in dotted lines the position the gears shifted from neutral position will occupy in first position and showing in dot and dash lines the position the shifted gears will occupy in reverse position;

Figure 6 is a similar diagram showing in full lines the positions the gears and the bars will occupy when shifted to second speed adjustment and in dotted lines the positions the shifted gears will occupy in third speed adjustment, and Figure 7 is a diagram indicating in full lines the positions the gears will occupy in four speed position and in dotted lines the positions occupied when in fifth speed position.

In these diagrams in Figures 5, 6 and 7 the bars or rails connected to and adapted to actuate said gears are marked with the numbers of such gears.

Referring to the drawings, 10 indicates one section of the drive shaft of the transmission on which is mounted one member of the clutch 11 through which power is transmitted from the crank shaft. The other section 12 of the drive shaft is provided with a spider 13 at the end thereof, adapted to be connected to the universal joint. Mounted on the shaft section 10 of the drive shaft is a gear 14 having constant mesh with a gear 15 carried by a counter shaft 16. This shaft is provided with a gear 17 which is adapted to be engaged by a shiftable larger gear 18 mounted on the section 12 of the drive shaft.

Fixed on the section 10 of the drive shaft is a gear 19 having constant mesh with a larger gear 20 of a counter shaft 21. A slidable gear 22 is mounted on the shaft 21 and is adapted to be shifted into and out of engagement with the gear 18 carried by the section 12 of the drive shaft. A slidable gear 23 on the counter shaft 16 is adapted to be moved into and out of engagement with a smaller gear 24 fixed on the driven section 12 of the drive shaft. On the other counter shaft 21 is a large gear 25 with which the gear 24 is adapted to be engaged. A reversing gear 26 is mounted on the counter shaft 16 and is in constant mesh with a reversing idler 27, on a stub shaft 28, with which gear 18 is adapted to be shifted into engagement.

The gears are adapted to be shifted by means of forks 29 mounted on four sliding shafts 30 which are in turn connected to longitudinally sliding rails or bars, one for each of the four shiftable gears, The rail 31 is connected to and adapted to operate the gear 24 to effect fourth and fifth speed adjustments. The rail 32 is connected to and adapted to operate the gear 23, while the rail 33 is connected to the gear 22 and rail 34 is connected to gear 18.

These rails are adapted to be shifted by the movement of a lug 35 on the lower end of the shift lever 36, shown in Figures 3 and 4. A laterally swinging locking member 37 is mounted in the lever casing 38 and is provided with two wings 38' and 39 adapted to lock those rails which are not to be moved by the lever. This lock is provided with a central slot 39' through which the lower end of the lever is free to move longitudinally with respect to the rails so as to permit the free actuation of the two adjacent rails by the lug. The lug is adapted to extend into slots 40 formed in the rails and these slots are in alinement when the rails and the gears occupy neutral positions as shown in Figure 5, in full lines. Stops 41 and 42 are fixed in the lever casing on opposite sides of the lever and are so disposed as to limit the lateral movement of the shift lever to two extreme positions of adjustment. In these positions of adjustment the lug at the lower end of the lever will overlap parts of two adjacent shifter rails as shown in the diagrams in Figures 5, 6 and 7 and also in Figure 3.

The lever is provided with a latch or abutment 43 adapted to bear against the stop 42 and which may be raised by means of a handle 44 so as to carry the latch above the stop and thus permit the lug to be swung past the same. It will be noted from the dotted line indication in Figure 5 that the line of engagement of the latch and stop is such that when the latch has been raised so that the lug may be swung past the stop, said lug will then be alined with rails 34 and 33.

The rail 34 effects the reverse adjustment and the first or low—low forward adjustment, this latter adjustment being the additional speed adjustment provided by this invention. This additional speed adjustment and the reverse arrangement being those which are most seldom used, the rails, therefore, are those which are arranged outside of the latch line.

In the operation of the device, in order to obtain first or low—low speed forward, the lug 35 of the shift lever is moved past the stop 42 by lifting the latch, and into alinement with the rails 33 and 34 and is then moved in the direction of the arrow on the rail 34, thus moving the said rail and the rail 33 in the same direction whereby the gear 18 is shifted into engagement with the gear 17 and the gear 22 is carried forward into free or additional neutral position. Thereupon the drive will be from the gear 14 on the section 10 of the drive through gear 15 on the counter shaft 16 and through the small gear 17 on said counter shaft and the larger gear 18 on the driven part 12 of the drive shaft.

To obtain reverse drive the lug 35 is shifted directly back from the first speed position to neutral. The lug is then shifted further back in the direction of the arrow corresponding to "reverse" on rail 34 thereby carrying the gear 18 into mesh with the reversing idler gear 27 which is in constant mesh with the reversing gear 26 on the shaft 16, and at the same time the gear 22 is carried back by the rail 33. In this adjustment the shifted gears 18 and 22 and the two shifted rails will occupy the positions indicated in dot and dash lines in Figure 5.

To obtain second speed forward the lug is moved into engagement with the rails 32 and 33 jointly and then moved to the left in the direction of the arrow marked "Second" whereupon, assuming that the lever is being moved from neutral position, the gear 22 will be carried into engagement with the gear 18 and the gear 23 will be carried into free or neutral position as indicated in full lines in Figure 6.

For third speed forward the rails 32 and 33 are moved in the opposite direction to that last described thereby carrying the gear 23 into engagement with the gear 24 and carrying the gear 22 into free or neutral position as shown in dotted lines in Figure 6.

To obtain fourth speed forward the lever lug is shifted through the slots to engage rails 31 and 32 and then moved so as to carry the rails in the direction of the arrow marked "Fourth," whereupon the gear 24 will be carried into engagement with the gear 25 and the gear 23 will be carried into free or neutral position as indicated in full lines in Figure 7.

For fifth speed the rails 31 and 32 are shifted in the opposite direction to that last described, thus carrying the internal teeth of the gear 24 into engagement with the external teeth 28 on the gear 19, whereupon the drive will be direct from the shaft section 10 to the section 12. The position the parts will then occupy is indicated in dotted lines in Figure 7.

The arrangement thus described distributes the shifting gears upon three shafts and provides a compact construction of gear box and one in which the shafts are rigidly supported and deflection thereof avoided. It will be seen that it is also possible to effect the shifting operation of the gears to obtain the five forward speeds by the usual four rail construction employed in four speed transmissions.

Having thus described my invention, what I claim and desire to secure by Letters Patent is:

1. In a motor vehicle, a change speed mechanism having a drive shaft in two sections, gears on said sections a pair of counter shafts having gears thereon adapted for engagement with the corresponding gears on the drive shaft and including shiftable gears, one of said drive shaft shiftable gears being movable with a gear on the other counter shaft, and shifting means operable to effect said joint operations.

2. In a motor vehicle, a change speed mechanism having a drive shaft in two sections, a pair of counter shafts each having a fixed gear in engagement with a corresponding fixed gear on one section of said drive shaft, two additional fixed gears on one of said counter shafts, a reversing idler gear in constant engagement with one of said additional fixed gears, a shiftable gear on the other section of said drive shaft, means for moving said shiftable gear into engagement with either the other additional fixed gear or said idler gear, a shiftable gear on the other countershaft and means for moving it into operative engagement with said shiftable gear on the shaft section.

3. In a motor vehicle a change speed mechanism having a drive shaft in two sections, a pair of counter shafts each having a fixed gear in engagement with a corresponding fixed gear on one section of said drive shaft, two additional fixed gears on one of said counter shafts, a reversing idler gear in constant engagement with one of said additional fixed gears, shiftable gear on the other section of said drive shaft normally in neutral position, a shiftable gear on the other counter shaft normally in the transverse line of the other one of said additional fixed gears and adapted to engage said shiftable gear on said drive shaft, operating means for simultaneously moving said shiftable gear on the drive shaft into engagement with said other additional fixed gear and the shiftable gear on the other counter shaft out of the transverse line of said additional fixed gear and for simultaneously moving said shiftable gears on the drive shaft and counter shaft in the reverse direction until said shiftable gear on the drive shaft engages said reversing idler gear.

4. In a motor vehicle, a change speed mechanism having a drive shaft in two sections, a pair of counter shafts each having a fixed gear in engagement with a corresponding fixed gear on one section of said drive shaft, additional fixed gears on said counter shafts a reversing idler gear in permanent engagement with a fixed gear on a counter shaft, shiftable gears on the other section of the drive shaft and on both counter shafts, means for simultaneously moving a shiftable gear on the drive shaft and a shiftable gear on a counter shaft from neutral position in one direction until said shiftable gear on the drive shaft engages a fixed gear on the other counter shaft for low speed and for then moving said shiftable gears back through neutral until the gear on the drive shaft engages the reversing idler gear and for then moving them back to neutral position, means for simultaneously moving said shiftable gear on the said counter shaft into engagement with said shiftable gear on said drive shaft and a shiftable gear on the other counter shaft to a neutral position and then both to neutral, means for simultaneously moving said shiftable gear on the first mentioned counter shaft to a neutral position and said last mentioned shiftable gear on said last mentioned counter shaft into engagement with a second shiftable gear on said drive shaft for third speed and then back to neutral, means for simultaneously moving said last mentioned shiftable gear on the drive shaft and said last mentioned shiftable gear on said last mentioned counter shaft until said shiftable gear on the drive shaft engages a fixed gear on the other counter shaft, and means for moving said last two mentioned shiftable gears in the reverse direction until the shiftable gear on the drive shaft makes engagement with a fixed gear on the other section of the drive shaft from that on which it is mounted.

5. In a motor vehicle, a change speed mechanism having a drive shaft in two sections, a pair of counter shafts each having a fixed gear in engagement with a corresponding fixed gear on one section of said drive shaft, other gears on said counter shafts and on the other section of said drive shaft including shiftable gears on each, the said gears being so constructed and related as to produce by different adjustments five changes of speed, and adjustable means having a single movable operating member for successively shifting the gears into successive engagements for the different speeds.

6. In a motor vehicle, a change speed mechanism having a drive shaft in two sections, a pair of countershafts each having a fixed gear in engagement with a corresponding fixed gear on one section of said drive shaft, other gears on said counter shafts and on the other section of said drive shaft including shiftable gears on each, the said gears being so constructed and related as to produce by different adjustments five changes of speed, four shifter rails for successively moving shiftable gears to form the gear connections for the different speeds and means for moving said rails.

7. In a motor vehicle, a change speed mechanism having a drive shaft in two sections, a pair of countershafts each having a fixed gear in engagement with a corresponding fixed gear on one section of said drive shaft, other gears on said counter shafts and on the other section of said drive shaft including shiftable gears on each, the said gears being so constructed and related as to produce by different adjustments five changes of speed, a reversing idler gear in constant engagement with a fixed gear on the drive shaft, four shifter rails operatively connected to said shiftable gears, means for moving said rails in successive pairs in both directions longitudinally from neutral position thereby successively bringing the gears into driving connections for low speed forward, reverse, second, third, fourth and fifth speed forward.

In testimony whereof I affix my signature.

ALFRED MOORHOUSE.